(12) United States Patent
Rudewick (10) Patent No.: US 8,756,129 B1
(45) Date of Patent: Jun. 17, 2014

(54) SYSTEM AND METHOD FOR TEXT MESSAGING OF FINANCIAL ACCOUNT DATA

(75) Inventor: Brent Rudewick, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

(21) Appl. No.: 11/871,067

(22) Filed: Oct. 11, 2007

(51) Int. Cl.
*G06Q 40/00* (2012.01)
*G06Q 40/02* (2012.01)

(52) U.S. Cl.
CPC .................................. *G06Q 40/02* (2013.01)
USPC ........................................................... 705/35

(58) Field of Classification Search
USPC .............................................. 705/35, 38–45
See application file for complete search history.

(56) References Cited

U.S. PATENT DOCUMENTS

| | | | |
|---|---|---|---|
| 6,560,456 B1* | 5/2003 | Lohtia et al. | 455/445 |
| 7,127,264 B2* | 10/2006 | Hronek et al. | 455/466 |
| 7,254,407 B1* | 8/2007 | Bokish | 455/456.3 |
| 7,257,558 B2 | 8/2007 | Schwartz | 705/62 |
| 7,258,269 B1 | 8/2007 | Block | 235/379 |
| 7,273,168 B2 | 9/2007 | Linlor | 235/319 |
| 7,277,919 B1 | 10/2007 | Donoho | 705/2 |
| 7,277,928 B2 | 10/2007 | Lennon | 705/219 |
| 2003/0200173 A1* | 10/2003 | Chang | 705/40 |
| 2004/0190707 A1* | 9/2004 | Ljubicich | 379/218.01 |
| 2005/0038744 A1* | 2/2005 | Viijoen | 705/42 |
| 2006/0213968 A1* | 9/2006 | Guest et al. | 235/375 |
| 2008/0162497 A1* | 7/2008 | Lim | 707/10 |

FOREIGN PATENT DOCUMENTS

| | | | | |
|---|---|---|---|---|
| WO | WO 00/72612 A1 * | 11/2000 | | H04Q 7/22 |
| WO | WO 2005/059800 A1 * | 6/2005 | | |
| WO | WO 2008/083297 A1 * | 7/2008 | | H04M 3/42 |

OTHER PUBLICATIONS

Geezeo Press Release. Geezeo Offers Consumers First-Ever Text-Message Access to All Financial Accouts. May 21, 2007.*
Bigda, carolyn. Text Your Bank for Next Statement. Chicago Tribune. Jul. 8, 2007. http://www.chicagotribune.com/business/chi-ym-started-0708jul08,0,161234,print.story.*
Bruene, Jim. Geezeo Marries Account Aggregation with Mobile Banking. Netbanker.com. May 15, 2007. http://www.netbanker.com/2007/05/geezeo_marries_account_aggregation_with_mobile_banking.html.*
New SMS Service from Maxis. New Straits Times. Kuala Lampur. Dec. 17, 2001. p. 02.*
Fujii, Reed. Bank of Stockton to Offer Banking by Text,. Knight Ridder Tribune Business News. Washington. May 19, 2007. p. 1.*
Geezeo Mobile Faq. Jun. 5, 2007. http://web.archive.org/web/20070605020122/discuss.geezeo.com/forums/1/topics/1.*
Bruene, Jim. Geezeo Marries Account Aggregation with Mobile Banking. Netbanker.com. May 15, 2007. http://www.netbankercom/2007/05/geezeo_marries_account_aggregation_with_mobile_banking.html.*

(Continued)

*Primary Examiner* — Stephanie M Ziegle
(74) *Attorney, Agent, or Firm* — Eric Sophir; Dentons US LLP (57) ABSTRACT

A method, a system and a computer-readable medium for responding to a text message request are enclosed. A method, a system and a computer-readable medium for providing financial information to a customer via a text message are enclosed. A method, a system and a computer-readable medium for providing access to financial information via a text message are enclosed. A method, a system and a computer-readable medium for providing a text message to a customer are enclosed.

15 Claims, 5 Drawing Sheets

(56) References Cited

OTHER PUBLICATIONS

Wilson, Peter. Telus to let you text-message your bank. Vancouver Sun. Apr. 2, 2007.*

Kilmartin, Liam et al. Real Time Stock Price Distribution Utilising the GSM Short Messaging Service. 1997. IEEE.*

Kim, Ryan. Banking on Your Phone. The Technology Chronicles. May 23, 2007. http://web.archive.org/web/20070523195917/http://www.sfgate.com/cgi-bin/blogs/sfgate/detail?blogid=19&entry_id=16715.*

ING Webpage on Banking Via Text Messaging. Jul. 20, 2006. http://web.archive.org/web/20060720211030/http://www.ing.be/private/topics.jsp?docid=144627_EN&topic=ebanking&menopt=the%7ceba%7cmob.*

Salesky, Joseph. Mobile-Phone Banking: Coming to a Bank Near You. USBanker. Jul. 2007.vol. 117, Iss 7. p. 48.*

Wilson, Peter. Text Messaging is the next step in banking. The Gazette, Montreal, Que. Apr. 3, 2007. p. B.2.*

Businesswire article 4Info Inc Partners with Financial Content to Deliver Financial Market Data via Test Messaging. May 2005. http://findarticles.com/p/articles/mi_pwwi/is_200505/ai_n13644817/print?tag=artBody;col1.*

Businesswire article Alpha Trade Completes First Tests of Bi-Directional Financial Data for Text Messaging. May 24, 2005. http://findarticles.com/p/articles/mi_m0EIN/is_2005_May_24/ai_n13776331/print?tag=artBody;col1.*

Yodlee Press Release. Yodlee Launches Yodlee Mobile SMS. Aug. 6, 2007. http://www.businesswire.com/portal/site/google/index.jsp?ndmViewId=news_view&newsId=20070806005325&newsLang=en.*

Geezeo Webpage on Security. Jun. 3, 2007. http://web.archive.org/web/20070603113419/http://www.geezeo.com/security.*

New Straits Times, Kuala Lumpur. New SMS Service from Maxis. Dec. 17, 2001. p. 2.*

Turner, Greg. Framingham Startup Launches text-message Tool to tap Financial Accounts. The Metrowest Daily News. May 21, 2007. http://www.metrowestdailynews.com/business/x211268700?view=print.*

JP Morgan Chase Press Release. TXT MSGS Make BNKG EZ. Sep. 19, 2007. http://investor.shareholder.com/jpmorganchase/releasedetail.cfm?ReleaseID=264788.*

* cited by examiner

SYSTEM AND METHOD FOR TEXT MESSAGING OF FINANCIAL ACCOUNT DATA

CROSS-REFERENCE TO RELATED APPLICATIONS

This application is related by subject matter to the subject matter disclosed in the following commonly assigned applications, the entirety of which are hereby incorporated by reference herein: U.S. patent application Ser. No. 11/870,938, U.S. patent application Ser. No. 11/871,036, U.S. patent application Ser. No. 11/871,058, U.S. patent application Ser. No. 11/871,088, each filed on Oct. 11, 2007 and each entitled "System and Method for Text Messaging of Financial Account Data."

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2007.

FIELD

This application is drawn to a method, a system, and a computer-readable medium geared toward text messaging communications in the financial industry.

BACKGROUND

Text messaging has become more commonplace among cell phone users over time. It is a way for users to communicate quickly with one another and to keep the conversation private, even in a busy place, which is not always possible through an ordinary cell phone communication. Text messaging is more common among younger generations, such as the 12-24 year-old age group. Users in this age range oftentimes communicate more by text message than they do ordinary cell phone communications.

In an effort to appeal to this age group, but more specifically to the 18-24 year old sector of this age group, commonly called "flow-throughs" who are young adults who continue to be supported by their parents financially, businesses should be able to communicate with these customers through the use of text messaging because this is how this group communicates.

Not only does text messaging appeal to the younger audience, but it also is convenient to other segments of the population, particularly to professional people or people always traveling, heavy cell phone users, and to those who are electronics lovers.

However, there is limited use of text messaging to mobile devices other than personal communications. Some cellular providers can send limited account information to a requesting mobile device, but advanced information or functionality is typically not available to a mobile device via text messaging.

SUMMARY

Offering text messaging as a method of communication will translate in the customers' eyes as being more progressive than other financial institutions, as being more customer service oriented, and as being more accessible to the customer.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, these embodiments are not limited to the specific methods and instrumentalities disclosed. In the drawings.

DETAILED DESCRIPTION OF ILLUSTRATIVE EMBODIMENTS

Figure 1:
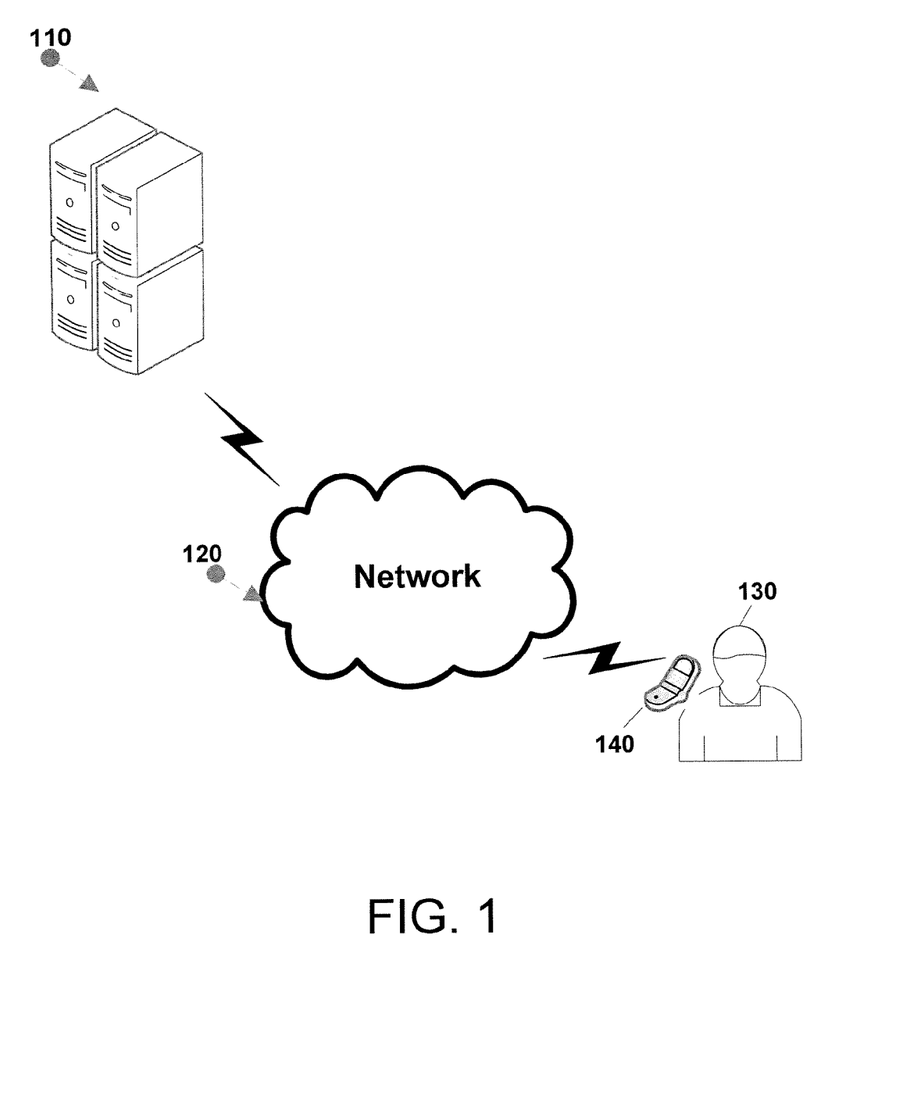
FIG. 1 is a graphical representation of a customer communicating with a financial institution via text message.

FIG. 1 shows the customer 130 using a cell phone 140 to text message a financial institution to retrieve account information. The message is transmitted across the customer's cellular provider's network 120 to the financial institution's network 110.

Figure 2:
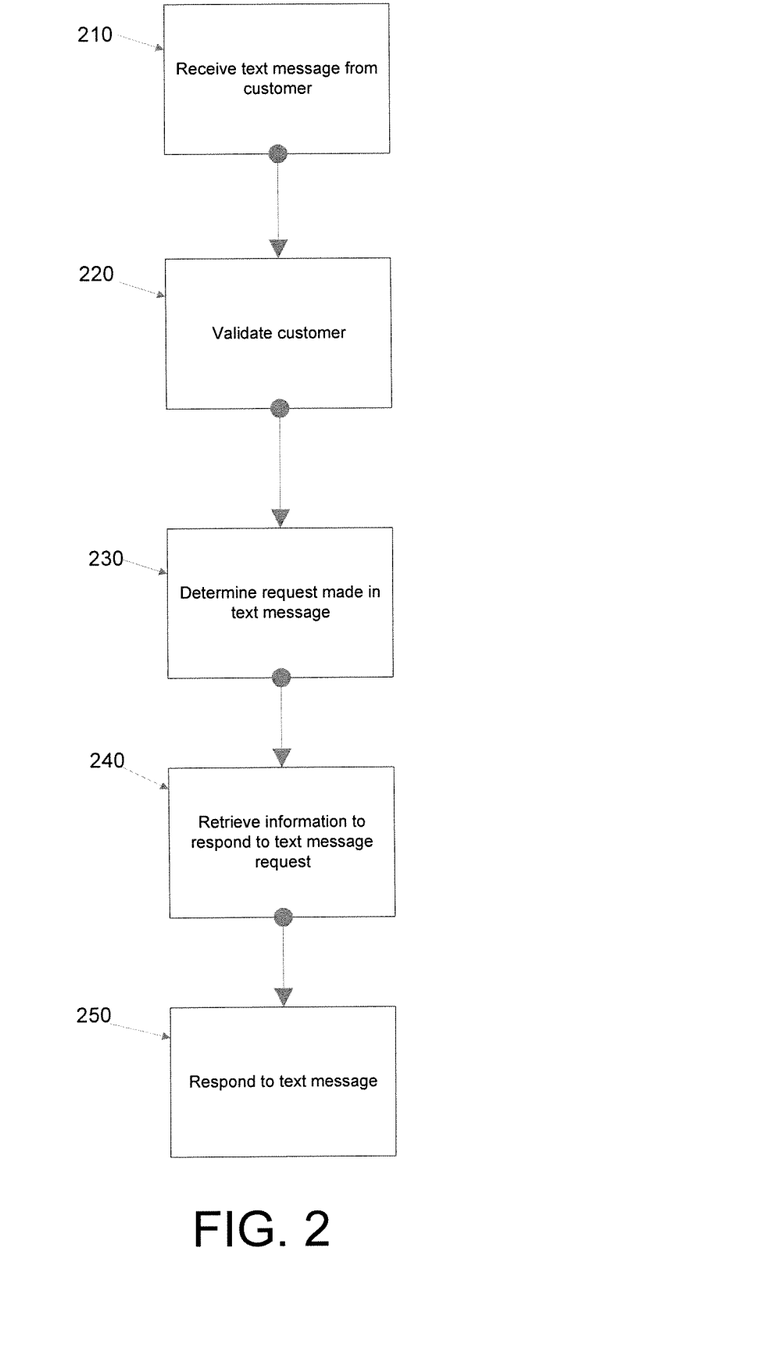
FIG. 2 is a block diagram representing an exemplary and non-limiting example of how a financial institution responds to a text message request.

In a first embodiment, illustrated by FIG. 2, a financial institution receives a text message from the customer 210. The financial institution then validates the customer 220 by looking at the member identification number or his on-line number. After validating the customer's identity, the system then determines what information is being requested in the text message 230. Requested information may include an account balance or the date that the last check has cleared a checking account. Next the information is retrieved 240 and the financial institution responds to the text message by sending the requested information to the customer 250. All of this is done automatically by the financial institution; therefore, there is no need for the financial institution to staff personnel to respond to the text messages.

Figure 3:
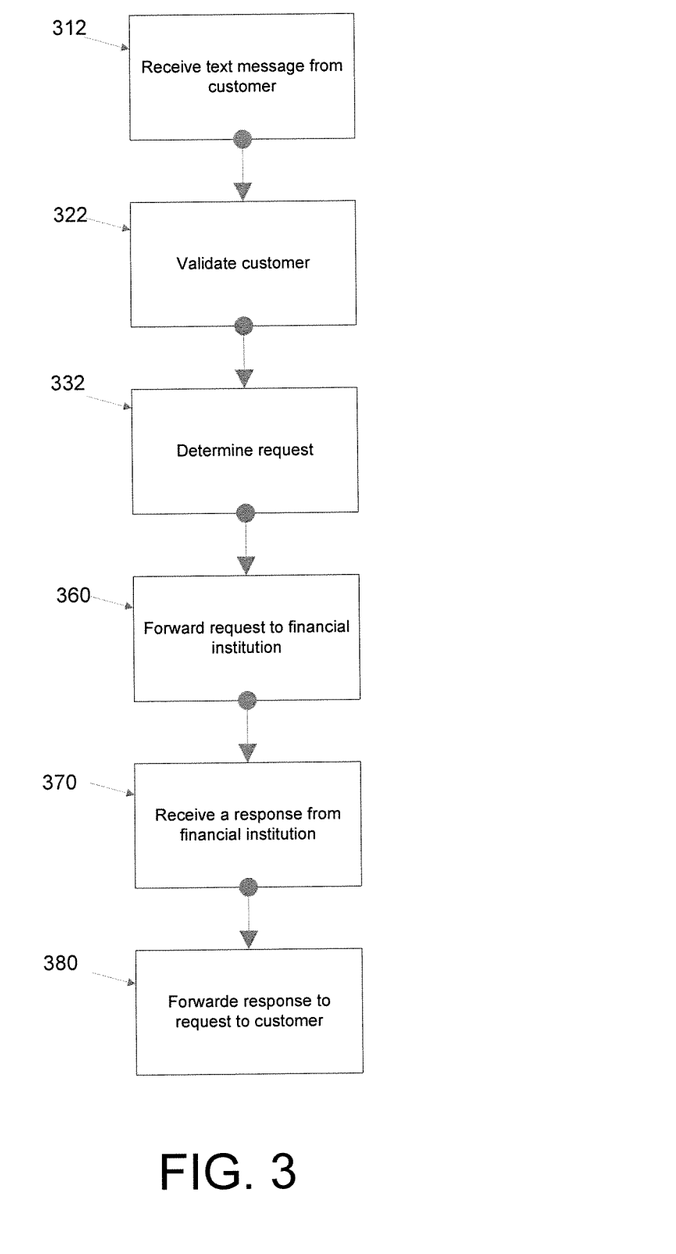
FIG. 3 is a block diagram representing an exemplary and non-limiting example of how a third party responds to a text message request from a customer to a financial institution.

In a second embodiment, illustrated by FIG. 3, the financial institution is using a third party to receive the text message and to respond to the text message. At step 312, the third party receives a text message that the customer intends for the financial institution. The third party validates or verifies the customer at step 322, then determines the request being made by the customer 332. The third party then forwards the customer's request to the financial institution 360 so that it may be processed. After the financial institution retrieves the information requested by the customer, the third party receives a response from the financial institution 370. This response is then forwarded to the customer in a text message 380.

In each of the aforementioned embodiments, the customer may text message a code that is used to identify the financial institution being contacted plus a customer identification number, either a member identification code or an on-line identification code, to identify the person making the request plus a question code identifying the information being requested, i.e. a code for a checking account balance. The identifier codes (financial institution identifier, customer identification number and question code) may be words or numbers and in combination may have the following forms: (1) company id—9999999—auto; (2) company id—9999999—123 (123 means auto); or (3) company id—9999999—1 (1 which means auto). Each of the three combinations may be used to symbolize a text message requesting when the customer's next automobile payment is due. Text messaging communications between the customer and the financial institution is very feasible, because not everyone has a computer due to the expense or due to a lack of comfort with the apparatus, but because more customers are likely have a cell phone than they do a land line telephone In one embodiment, if the customer sends the financial institution a text message including the financial institution identifier plus a customer identification code, but does not include a question code because he does not know it, the customer will receive a text message in return from the financial institution with a list of question codes. The customer may download the question codes to his cell phone for future reference. In an alternative embodiment, instead of the customer sending a message consisting of the combination of a financial institution identifier, a customer identification number and a question code, the customer may send a text message consisting of a general telephone number to the financial institution. The financial institution will then send an automatic response that includes a list of telephone numbers, each containing a question code representing different features, i.e. auto loan balance, that the customer may text message to the financial institution directly requesting the information desired. The list of telephone numbers may be downloaded to the customer's cell phone for future reference.

The different types of accounts that the customer may inquire about via text message include, but are not limited to, banking, insurance and investment. Banking account inquiries may include checking account balance, last check cleared, savings account balance, credit card balance, credit card bill due, next mortgage payment due, and next car payment due. Insurance account inquiries may include when the next automobile insurance payment is due, when the next homeowners insurance payment is due, when the next renters insurance payment is due, the last rate increase or decrease, when the next life insurance policy payment is due, and what the status is of a claim (pending or approved). Investment account inquiries may include brokerage account balance, current individual retirement account (IRA) balance (at end of day), and the price of a certain stock for that day. Additionally, the customer may trade stocks over text-messaging (buy, sell).

In addition to text messaging the financial institution to inquire about account information, the customer may text message the financial institution to document attendance at financial institution promotional events or to participate in financial institution contests or promotions.

Description of Exemplary Computing and Network Environment

Aspects of the presently disclosed subject matter are operational with numerous other general purpose or special purpose computing system environments or configurations. Examples of well known computing systems, environments, and/or configurations that may be suitable for use with this subject matter include, but are not limited to, personal computers (PCs), server computers, hand-held or laptop devices, multiprocessor systems, microprocessor-based systems, set top boxes, programmable customer electronics, network PCs, minicomputers, mainframe computers, distributed computing environments that include any of the above systems or devices, and the like.

Aspects of the presently disclosed subject matter may be implemented in the general context of computer-executable instructions, such as program modules, being executed by a computer. Generally, program modules include routines, programs, objects, components, data structures, etc. that performs particular tasks or implement particular abstract data types. Aspects of the presently disclosed subject matter may also be practiced in distributed computing environments where tasks are performed by remote processing devices that are linked through a communications network. In a distributed computing environment, program modules may be located in both local and remote computer storage media including memory storage devices.

Figure 4:
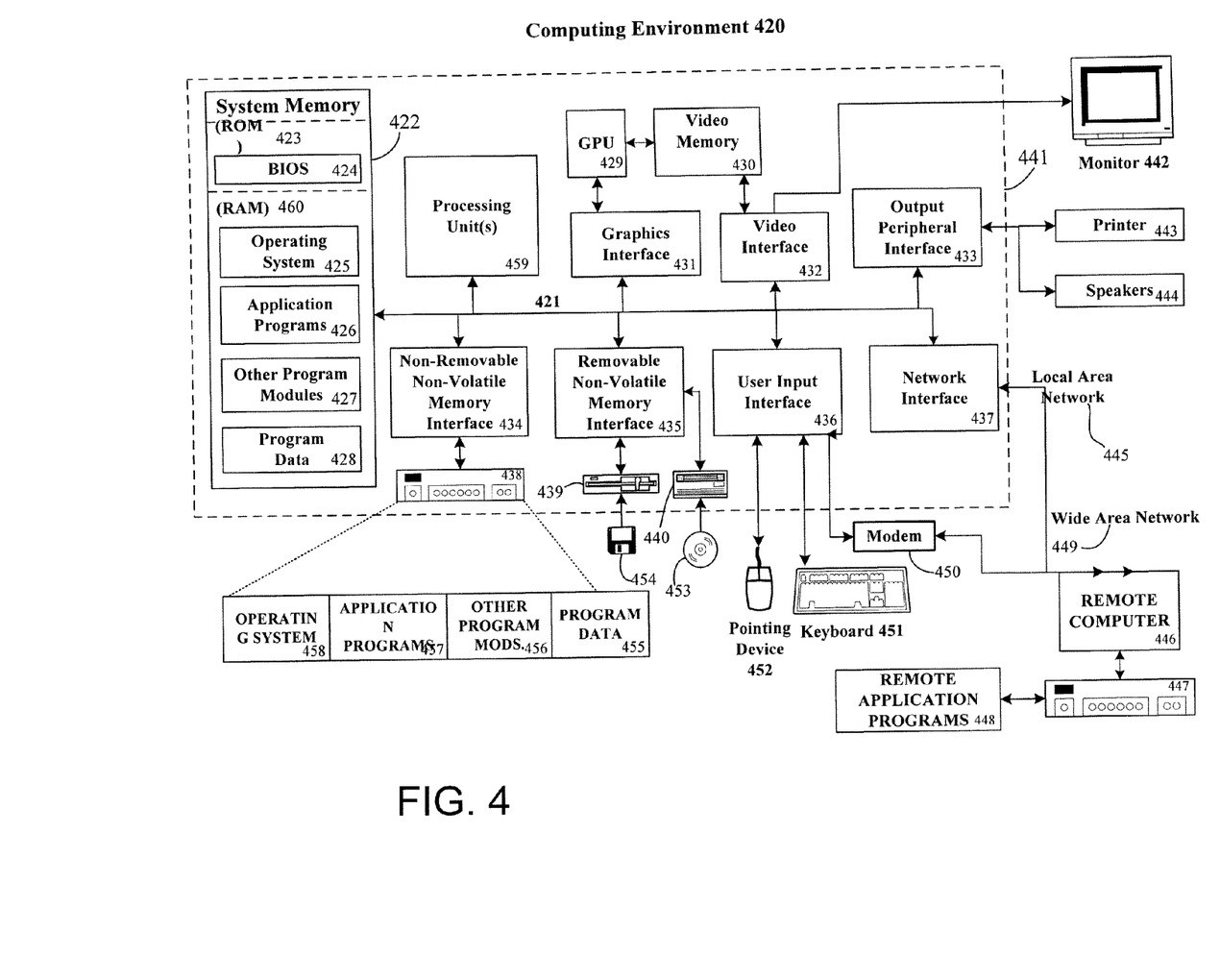
FIG. 4 is a block diagram representing an example computing device environment in which the illustrative embodiments may be employed.

Referring to FIG. 4, shown therein is a block diagram representing an exemplary computing device suitable for use in conjunction with implementing the systems and methods described above. For example, the computer executable instructions that carry out the processes and methods described herein may reside and/or be executed in such a computing environment as shown in FIG. 4. The computing system environment 420 is only one example of a suitable computing environment and is not intended to suggest any limitation as to the scope of use or functionality of the presently disclosed subject matter. Neither should the computing environment 420 be interpreted as having any dependency or requirement relating to any one or combination of components illustrated in the exemplary operating environment 420.

An exemplary system for implementing aspects of the presently disclosed subject matter includes a general purpose computing device in the form of a computer 441. Components of computer 441 may include, but are not limited to, a processing unit 459, a graphical processing unit (GPU) 429, a video memory 430, a graphics interface 431, a system memory 422, and a system bus 421 that couples various system components including the system memory 422 to the processing unit 459. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 441 typically includes a variety of computer readable media. Computer readable media can be any available media that can be accessed by computer 441 and includes both volatile and nonvolatile media, removable and non-removable media. By way of example, and not limitation, computer readable media may comprise computer storage media and communication media. Computer storage media include volatile and nonvolatile, removable and non-removable media implemented in any method or technology for storage of information such as computer readable instructions, data structures, program modules or other data. Computer storage media includes, but is not limited to, random access memory (RAM), read-only memory (ROM), EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 441. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of the any of the above should also be included within the scope of computer readable media.

The system memory 422 includes computer storage media in the form of volatile and/or nonvolatile memory such as ROM 423 and RAM 460. A basic input/output system (BIOS) 424, containing the basic routines that help to transfer information between elements within computer 441, such as during start-up, is typically stored in ROM 423. RAM 460 typically contains data and/or program modules that are immediately accessible to and/or presently being operated on by processing unit 459. By way of example, and not limitation, FIG. 4 illustrates operating system 425, application programs 426, other program modules 427, and program data 428.

The computer 441 may also include other removable/non-removable, volatile/nonvolatile computer storage media. By way of example only, FIG. 4 illustrates a hard disk drive 438 that reads from or writes to non-removable, nonvolatile magnetic media, a magnetic disk drive 439 that reads from or writes to a removable, nonvolatile magnetic disk 454, and an optical disk drive 440 that reads from or writes to a removable, nonvolatile optical disk 453 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 438 is typically connected to the system bus 421 through an non-removable memory interface such as interface 434, and magnetic disk drive 439 and optical disk drive 440 are typically connected to the system bus 421 by a removable memory interface, such as interface 435.

The drives and their associated computer storage media discussed above and illustrated in FIG. 4, provide storage of computer readable instructions, data structures, program modules and other data for the computer 441. In FIG. 4, for example, hard disk drive 438 is illustrated as storing operating system 458, application programs 457, other program modules 456, and program data 455. Note that these components can either be the same as or different from operating system 425, application programs 426, other program modules 427, and program data 428. Operating system 458, application programs 457, other program modules 456, and program data 455 are given different numbers here to illustrate that, at a minimum, they are different copies. A user may enter commands and information into the computer 441 through input devices such as a keyboard 451 and pointing device 452, commonly referred to as a mouse, trackball or touch pad. Other input devices (not shown) may include a microphone, joystick, game pad, satellite dish, scanner, or the like. These and other input devices are often connected to the processing unit 459 through a user input interface 436 that is coupled to the system bus, but may be connected by other interface and bus structures, such as a parallel port, game port or a universal serial bus (USB). A monitor 442 or other type of display device is also connected to the system bus 421 via an interface, such as a video interface 432. In addition to the monitor, computers may also include other peripheral output devices such as speakers 444 and printer 443, which may be connected through an output peripheral interface 433.

The computer 441 may operate in a networked environment using logical connections to one or more remote computers, such as a remote computer 446. The remote computer 446 may be a PC, a server, a router, a network PC, a peer device or other common network node, and typically includes many or all of the elements described above relative to the computer 441, although only a memory storage device 447 has been illustrated in FIG. 4. The logical connections depicted in FIG. 4 include a local area network (LAN) 445 and a wide area network (WAN) 449, but may also include other networks. Such networking environments are commonplace in offices, enterprise-wide computer networks, intranets and the Internet.

When used in a LAN networking environment, the computer 441 is connected to the LAN 445 through a network interface or adapter 437. When used in a WAN networking environment, the computer 441 typically includes a modem 450 or other means for establishing communications over the WAN 449, such as the Internet. The modem 450, which may be internal or external, may be connected to the system bus 421 via the user input interface 436, or other appropriate mechanism. In a networked environment, program modules depicted relative to the computer 441, or portions thereof, may be stored in the remote memory storage device. By way of example, and not limitation, FIG. 4 illustrates remote application programs 448 as residing on memory device 447. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the presently disclosed subject matter, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the said subject matter is not so limited, but rather may be implemented in connection with any computing environment, such as a network or distributed computing environment. Further, aspects of the presently disclosed subject matter may be implemented in or across a plurality of processing chips or devices, and storage may similarly be affected across a plurality of devices. Such devices might include PCs, network servers, handheld devices, supercomputers, or computers integrated into other systems.

In light of the diverse computing environments that may be built according to the general framework provided in FIG. 4, the systems and methods provided herein cannot be construed as limited in any way to a particular computing architecture. Instead, the presently disclosed subject matter should not be limited to any single embodiment, but rather should be construed in breadth and scope in accordance with the appended claims.

Figure 5:
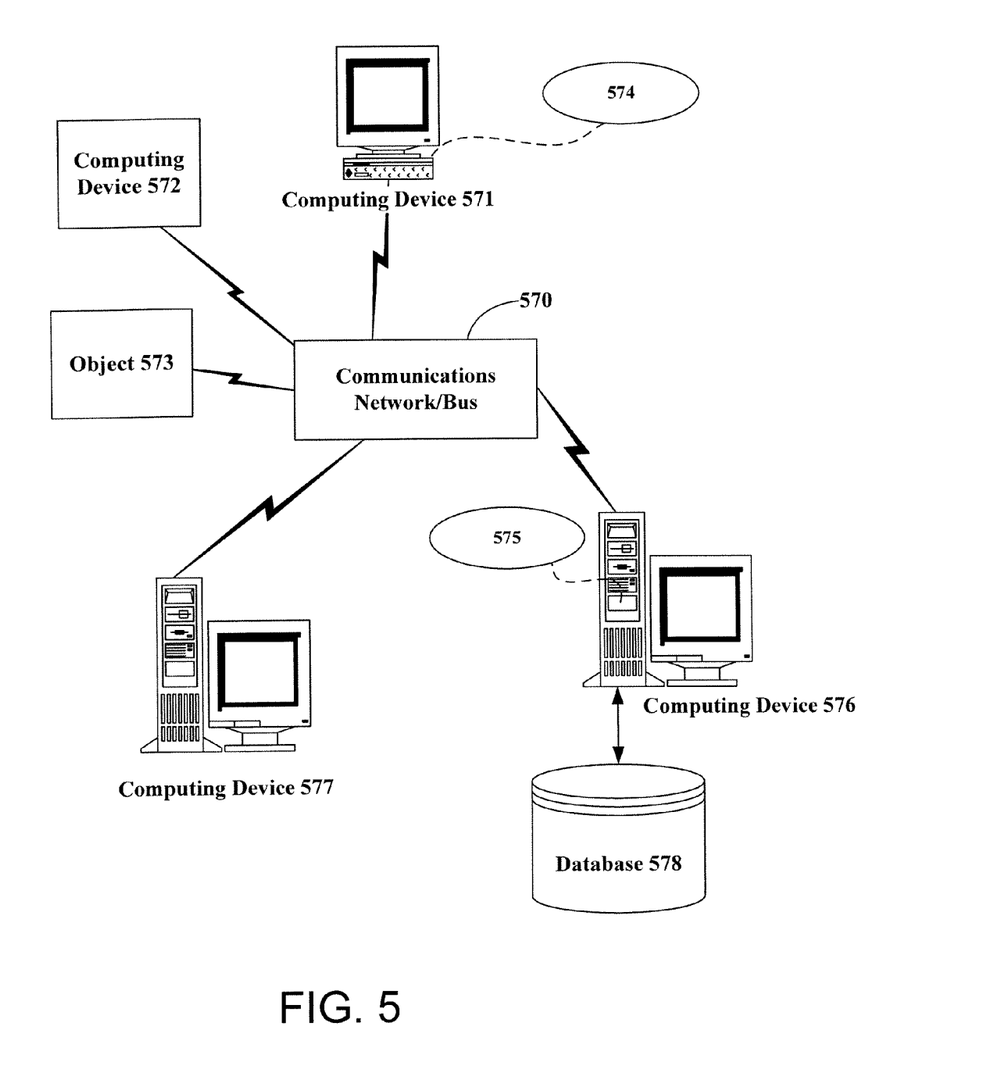
FIG. 5 is a block diagram representing an example networked computing environment in which the illustrative embodiments may be employed.

Referring next to FIG. 5, shown therein is an exemplary networked computing environment in which many computerized processes may be implemented to perform the processes described above. One of ordinary skill in the art can appreciate that networks can connect any computer or other client or server device, or in a distributed computing environment. In this regard, any computer system or environment having any number of processing, memory, or storage units, and any number of applications and processes occurring simultaneously, is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 5 provides a schematic diagram of an exemplary networked or distributed computing environment. The environment comprises computing devices 571, 572, 576, and 577 as well as objects 573, 574, and 575, and database 578. Each of these entities 571, 572, 573, 574, 575, 576, 577, and 578 may comprise or make use of programs, methods, data stores, programmable logic, etc. The entities 571, 572, 573, 574, 575, 576, 577, and 578 may span portions of the same or different devices such as personal data assistants (PDAs), audio/video devices, MPEG-1 Audio Layer 3 (MP3) players, personal computers, etc. Each entity 571, 572, 573, 574, 575, 576, 577, and 578 can communicate with another entity 571, 572, 573, 574, 575, 576, 577, and 578 by way of the communications network 570. In this regard, any entity may be responsible for the maintenance and updating of a database 578 or other storage element.

This network 570 may itself comprise other computing entities that provide services to the system of FIG. 5, and may itself represent multiple interconnected networks. In accordance with an aspect of the presently disclosed subject matter, each entity 571, 572, 573, 574, 575, 576, 577, and 578 may contain discrete functional program modules that might make use of an API, or other object, software, firmware and/or hardware, to request services of one or more of the other entities 571, 572, 573, 574, 575, 576, 577, and 578.

It can also be appreciated that an object, such as 575, may be hosted on another computing device 576. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 5, any entity 571, 572, 573, 574, 575, 576, 577, and 578 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 5 and the further diversification that can occur in computing in a network environment such as that of FIG. 5, the systems and methods provided herein cannot be construed as limited in any way to a particular computing architecture or operating system. Instead, the presently disclosed subject matter should not be limited to any single embodiment, but rather should be construed in breadth and scope in accordance with the appended claims.

As mentioned above, while exemplary embodiments of the invention have been described in connection with various computing devices, the underlying concepts may be applied to any computing device or system. Thus, the methods and systems of the present invention may be applied to a variety of applications and devices. While exemplary names and examples are chosen herein as representative of various choices, these names and examples are not intended to be limiting. One of ordinary skill in the art will appreciate that there are numerous ways of providing hardware and software implementations that achieves the same, similar or equivalent systems and methods achieved by the invention.

As is apparent from the above, all or portions of the various systems, methods, and aspects of the present invention may be embodied in hardware, software, or a combination of both.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. A method for providing access to financial information via a text message, the method comprising:
   receiving, by a computer processor on a computing device, a text message from a customer;
   determining, by the computer processor, financial institution identifier number based on the text message;
   determining, by the computer processor, a customer identifier number based on the text message;
   determining, by the computer processor, whether the text message contains a request code;
   responsive to determining that the text message does contain the request code, sending, by the computing processor, a response to the text message from the computing device to the customer, the response comprising information being requested in the text message;
   responsive to determining that the text message does not contain the request code, determining, by the computer processor, a plurality of numerical request codes based on the financial institution identifier number and the customer identifier number, wherein one of the plurality of numerical request codes is a numerical request code for an auto loan balance; and
   sending, by the computing processor, a response to the text message from the computing device to the customer; the response comprising the plurality of numerical request codes.

2. The method of claim 1, wherein the plurality of numerical request codes comprise numerical codes associated with a status of at least one of a banking account, a credit card account, a savings account, a mortgage account, and an auto loan account.

3. The method of claim 1, wherein the plurality of numerical request codes comprise numerical codes associated with a status of at least one of an automobile insurance policy, a renters insurance policy, and a life insurance policy.

4. The method of claim 1, wherein the plurality of numerical request codes comprise numerical codes associated with at least one of a brokerage account balance and a retirement account balance.

5. The method of claim 1, wherein the plurality of numerical request codes comprise numerical codes associated with at least one stock price.

6. A system for providing access to financial information via a text message, the system comprising:
   a computing device having a processor and a non-transitory computer-readable medium for storing computer-readable instructions that are executable by the processor to:
   receive a text message from a customer;
   determine a financial institution identifier number based on the text message;
   determine a customer identifier number based on the text message;
   determine whether the text message contains a request code;
   responsive to determining that the text message does contain the request code, send a response to the text message comprising information being requested in the text message;
   responsive to determining that the text message does not contain the request code, determine a plurality of numerical request codes based on the financial institution identifier number and the customer identifier number, wherein one of the plurality of numerical request codes is a numerical request code for an auto loan balance; and
   send a response to the text message comprising the plurality of numerical request codes.

7. The system of claim 6, wherein the plurality of numerical request codes comprise numerical codes associated with a status of at least one of a banking account, a credit card account, a savings account, a mortgage account, and an auto loan account.

8. The system of claim 6, wherein the plurality of numerical request codes comprise numerical codes associated with a status of at least one of an automobile insurance policy, a renter's insurance policy, and a life insurance policy.

9. The system of claim 6, wherein the plurality of numerical request codes comprise numerical codes associated with at least one of a brokerage account balance and a retirement account balance.

10. The system of claim 6, wherein the plurality of numerical request codes comprise numerical codes associated with at least one stock price.

11. A set of computer-readable instructions stored on a non-transitory computer-readable medium for providing access to financial information via a text message, which when executed causes a computer processor to:
    receive a text message from a customer;
    determine a financial institution identifier number based on the text message;
    determine a customer identifier number based on the text message;
    determine whether the text message contains a request code;
    responsive to determining that the text message does contain the request code, send a response to the text message comprising information being requested in the text message;
    determine, responsive to determining that the text message does not contain the request code, a plurality of numerical request codes based on the financial institution identifier number and the customer identifier number, wherein one of the plurality of numerical request codes is a numerical request code for an auto loan balance, and
    send a response to the text message comprising the plurality of numerical request codes.

12. The computer-readable instructions of claim 11, wherein the plurality of numerical request codes comprise numerical codes associated with a status of at least one of a banking account, a credit card account, a savings account, a mortgage account, and an auto loan account.

13. The computer-readable instructions of claim 11, wherein the plurality of numerical request codes comprise numerical codes associated with a status of at least one of an automobile insurance policy, a renters insurance policy, and a life insurance policy.

14. The computer-readable instructions of claim 11, wherein the plurality of numerical request codes comprise numerical codes associated with at least one of a brokerage account balance and a retirement account balance.

15. The computer-readable instructions of claim 11, wherein the plurality of numerical request codes comprise numerical codes associated with at least one stock price.

* * * * *